United States Patent [19]

Takishima

[11] Patent Number: 5,313,603
[45] Date of Patent: May 17, 1994

[54] ARRANGEMENT OF CONTROLLING MEMORY ACCESS REQUESTS TO GROUPED MEMORY BANKS

[75] Inventor: Tohru Takishima, Tokyo, Japan

[73] Assignee: Nec Corporation, Tokyo, Japan

[21] Appl. No.: 606,985

[22] Filed: Oct. 31, 1990

[30] Foreign Application Priority Data

Nov. 1, 1989 [JP] Japan ................ 1-285934

[51] Int. Cl.$^5$ .............................................. G06F 12/00
[52] U.S. Cl. ................................ 395/425; 364/238.4;
364/254.4; 364/DIG. 1; 364/926.92;
364/957.2; 364/966.3; 364/DIG. 2
[58] Field of Search ............... 395/425, 325, 250, 725;
364/DIG. 1, 264.4, 238.4, 254.4, DIG. 2, 966.3,
926.92, 957.2; 365/230.03, 230.04

[56] References Cited

U.S. PATENT DOCUMENTS

| | | | |
|---|---|---|---|
| 4,435,765 | 3/1984 | Uchida et al. | 395/550 |
| 4,866,603 | 9/1989 | Chiba | 395/425 |
| 4,903,197 | 2/1990 | Wallace et al. | 395/425 |
| 4,924,375 | 5/1990 | Fung et al. | 395/425 |

*Primary Examiner*—Michael R. Fleming
*Assistant Examiner*—Glenn A. Auve
*Attorney, Agent, or Firm*—Sughrue, Mion, Zinn, Macpeak & Seas

[57] ABSTRACT

A plurality of banks is divided into a plurality of bank groups and a pair of read and write data control registers is assigned to each of the bank groups. A memory main controller is operatively coupled to the bank groups and controls read/write operations of the banks. The memory main controller receives bank access requests from a system controller and generates a request rejected signal in the event that a bank access request consecutively occurs in connection with one bank group. Thus, application of two successive data to each of the read and write data control registers with the same bank group is prohibited, and erroneous data storage in the above-mentioned data control registers is prevented.

4 Claims, 3 Drawing Sheets

ARRANGEMENT OF CONTROLLING MEMORY ACCESS REQUESTS TO GROUPED MEMORY BANKS

BACKGROUND OF THE INVENTION

1. Field of the Invention

The present invention relates to an arrangement of controlling memory access requests to a plurality of memory banks in a digital data processing system, and more specifically to such an arrangement in which the memory banks to be accessed, are arranged in interleaved groups. The present invention features effective reduction of the number of read/write data control registers which are inherently required to be coupled to the banks.

2. Description of the Prior Art

In order to obtain a higher data rate in storing information into a memory and retrieving same therefrom, it is known to utilizing an approach called interleaving. The interleaved groups of memory chips are referred to as banks.

When data is to be memorized, data set-up time and data hold time are required to assuredly store and retrieve the data. Accordingly, in accordance with prior art techniques, a pair of read and write data control registers (hereinafter referred to as "data control registers") are provided for each bank.

In order to reduce the number of components in a digital data processing system, it is very desirable if all of the data control registers to be provided for the banks can be configured on a single LSI (Large Scale Integration) chip. However, in accordance with the prior art techniques, since each bank requires two data control registers for read and write operations, the number of pins of the LSI chip increases with increase in the number of data control registers fabricated therein. The number of pins of such a LSI chip is determined by multiplying the data width two times the number of data control registers to be provided.

The prior art techniques therefore have encountered the problem in that the data control registers to be used cannot be accommodated in one LSI chip in the event that the number of data control registers increases. This of course creates a barrier which must be overcome before the degree of integration can be overcome.

SUMMARY OF THE INVENTION

It is an object of the present invention to provide an arrangement of controlling memory access requests to grouped banks, in which one pair of data control registers is allocated to one bank group.

In brief, the above objects are achieved by an arrangement wherein a plurality of banks is divided into a plurality of bank groups and wherein a pair of read and write data control registers is assigned to each of the bank groups. A memory main controller is operatively coupled to the bank groups and controls read/write operations of the banks. The memory main controller receives bank access requests from a system controller and generates a request rejected signal in the event that a bank access request consecutively occurs in connection with one bank group. Thus, application of two successive data to each of the read and write data control registers with the same bank group is prohibited, and erroneous data storage in the above-mentioned data control registers is prevented.

More specifically an aspect of the present invention comes in an arrangement of controlling access requests to banks in a digital data processing system, comprising: a plurality of banks which are divided into a plurality of bank groups; first means, the first means operatively coupled to the plurality of banks and controlling read and write operations thereof, the first means receiving a plurality of bank access requests, the first means issuing a first signal indicating that a bank access request has not been accepted in the event that the bank request consecutively occurs within one bank group, the first signal being applied to a system controller; and a plurality of pairs of read and write data control registers, each of the pairs of read and write data control registers being assigned to one bank group and being controlled by the first means.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

A preferred embodiment of this invention will be discussed with reference to FIGS. 1 to 3.

Figure 1:
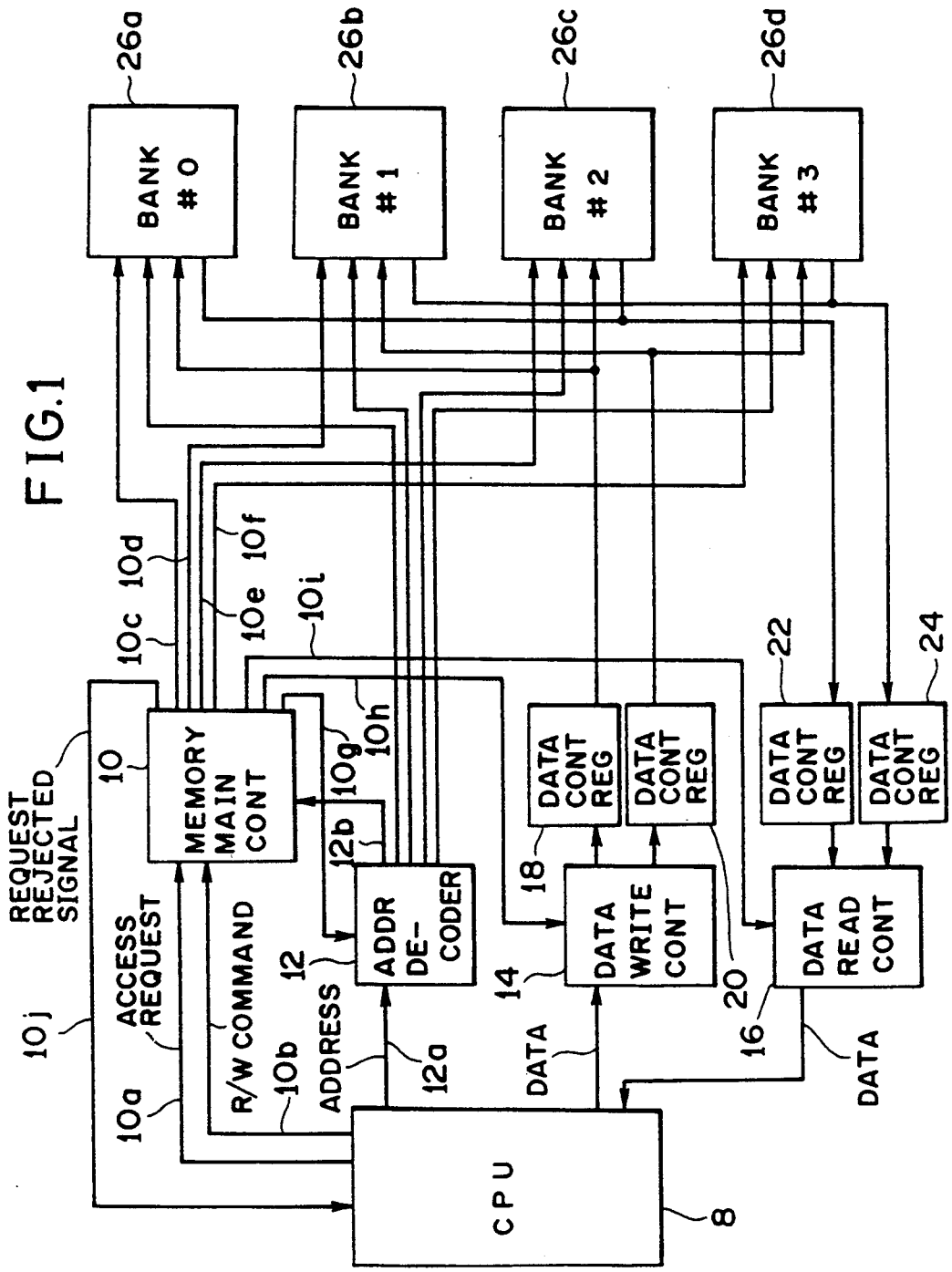
FIG. 1 is a block diagram schematically illustrating an arrangement of controlling memory access requests to grouped banks.

The arrangement shown in FIG. 1 includes, a memory main controller 10, an address decoder 12, a data write controller 14, a data read controller 16, four data control registers 18, 20, 22 and 24, and four memory banks 26a, 26b, 26c and 26d, all of which are coupled as shown. For the sake of convenience the banks 26a, 26b, 26c and 26d are also denoted by #0, #1, #2 and #3, respectively. The blocks 10, 12, 14 and 16 are coupled to a suitable system controller or system processor such as a central processing unit (CPU) 8. The CPU processor 8 is not directly concerned with the instant invention and hence the description thereof will be omitted for brevity.

As shown in FIG. 1, one pair of data control registers 18 and 22 are provided for the banks #0 and #2 (first bank group), while the other pair of data control registers 20 and 24 for the banks #1 and #3 (second bank group). This means that the number of the data control registers can be reduced to one half as compared with the conventional techniques wherein one pair of data control registers should be provided for each bank.

In order to comply with the reduction of the number of the data control registers, the memory main controller 10 issues a request rejected signal 10j in the event that two consecutive bank access requests occur in the same bank group. More specifically, the controller 10 outputs the request rejected signal 10j in response to the application thereto of the second bank access of the two consecutive ones. This is because the content of the data control registers 18, 20, 22 and 24 may be destroyed by the data applied thereto in response to the above-mentioned second bank access request. The request rejected signal 10j is applied to the CPU 8 which reissues the rejected request later.

The address decoder 12 is responsive to address information 12a applied thereto from the CPU 8 and generates an address signal 12b over a line coupled to the controller 10. The memory main controller 10 receives, in addition to the address signal 12b, a memory access request 10a and a read/write command 10b from the processor 8. The controller 10 specifies one of the banks #0 to #3 in response to the address signal 12b, and supplies the addressed bank with a memory request timing signal over one of lines 10c through 10f. Further, the controller 10 outputs three control signals 10g, 10h and 10i. The memory request timing signal includes a row address strobe, a column address strobe and read-/write enable signal, etc. as is well known in the art. The time point when the memory main controller 10 generates the above-mentioned memory request timing signal as well as the control signals 10g-10i, will be described later.

The four banks #0 to #3 are divided into two groups in this embodiment. As mentioned above, the first group includes the banks #0 and #2 while the second group the banks #1 and #3.

The address decoder 12 applies the address signal to one of the banks 26a through 26d in response to the control signal 10g applied from the controller 10.

The data write controller 14 supplies one of the four banks #0 to #3 with the data to be stored, via one of the two data control registers 18 and 20, in response to the control signal 10h from the controller 10 which specifies the bank to be accessed. On the other hand, the data read controller 16 receives retrieved data from one of the four banks #0 to #3 via one of the two data control registers 22 and 24 in response to the control signal 10i from the controller 10.

The instant invention will further be described with reference to FIG. 2, which shows the arrangement of the memory main controller 10 of FIG. 1 which is directly concerned with the instant invention. It should be noted that the remaining portions of the controller 10, which is not relevant to the present invention, are omitted for the purposes of simplifying the figure. Accordingly, the blocks relating to the read/write command 10b, the control signals 10g-10i, and the address signal 12b, are not shown in FIG. 2.

Figure 2:
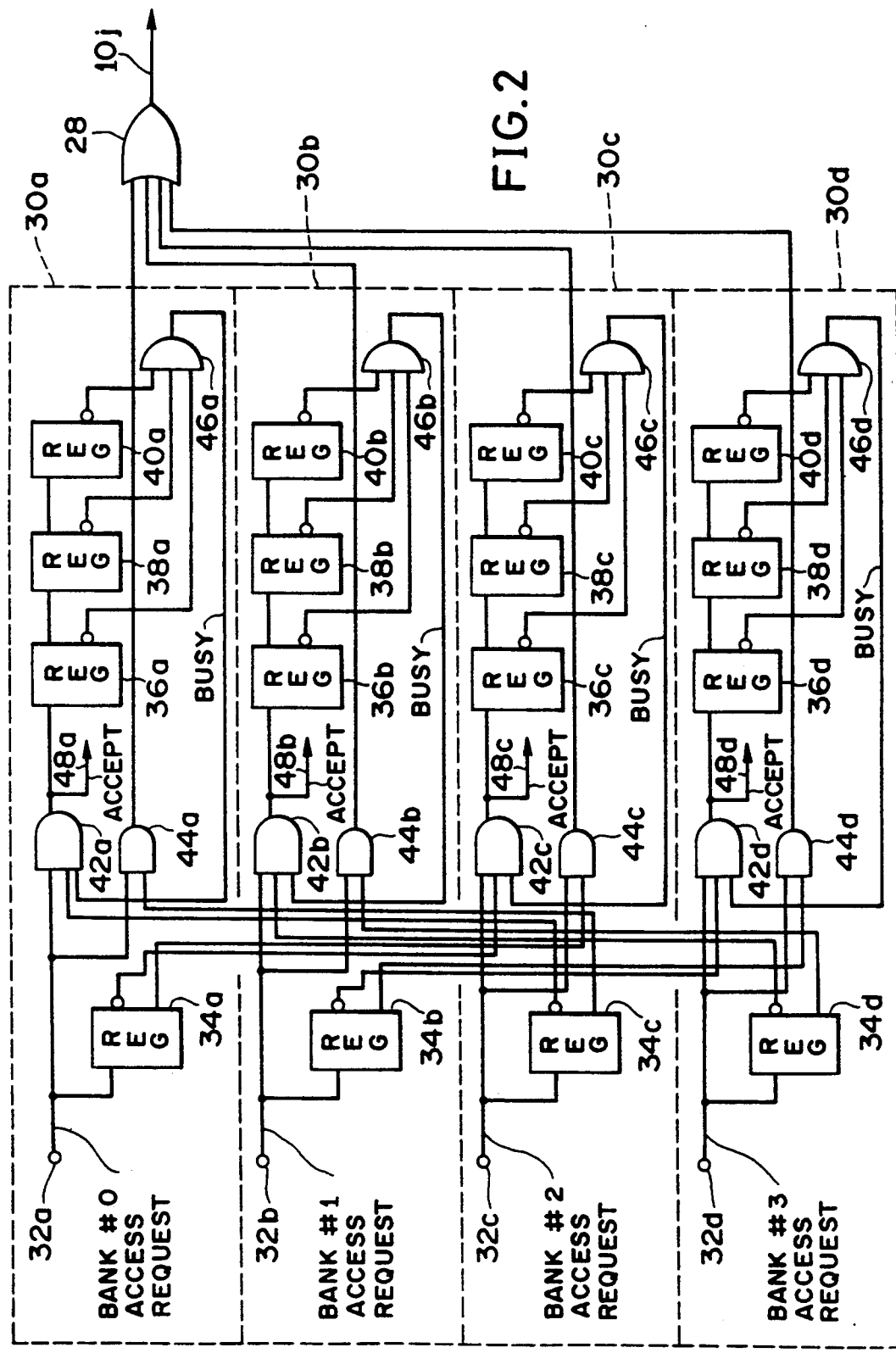
FIG. 2 is a block diagram illustrating in detail one block of the FIG. 1 arrangement.

The FIG. 2 arrangement includes an OR gate 28, and four sections 30a, 30b, 30c and 30d which are respectively provided for bank #0 to #3. The section 30a includes an input terminal 32a to which a bank #0 access request is applied, four shift registers 34a, 36a, 38a and 40a, and three AND gates 42a, 44a and 46a. Each of the other sections 30b, 30c and 30d has an arrangement identical to the section 30a. Accordingly, each of the counterparts of the sections 30b-30d is denoted by same reference numeral plus a corresponding lower case character ("b", "c" or "d").

The operation of the FIG. 2 arrangement will be discussed with reference to FIG. 3 which illustrates in timing chart form, the manner in which signals are generated in the FIG. 2 arrangement. It should be noted that the disclosure relating to the AND and OR gates is such that the upper most input terminal is referred to as being the "first" terminal, the next lower one the "second" and so on. That is to say, first, second and third are used in descending order. The input terminals 32b, 32c and 32d are supplied with access requests to the banks #1, #2 and #3, respectively.

The sections 30a and 30c for the first bank group (the banks #0 and #2), functions in the same manner as the arrangements 30b and 30d for the second bank group (#1 and #3). Accordingly, only the operation of the arrangements 30a and 30c will be discussed in detail.

It is assumed that each of the bank requests #0 to #3, which are respectively applied to the input terminals 32a to 32d, assumes a logic 0 at a time slot "0". As a result, at a time slot "1", the shift register 34c applies the logic 1 from the inverted output terminal thereof to the second input of the AND gate 42a. In this case, the output of the AND gate 46a (viz., busy signal) assumes a logic 1 which indicates that the corresponding bank #0 is available or accessible. Thus, when the bank #0 request (viz., logic 1) is applied to the AND gate 42a at the time slot "1", it passes through the AND gate 42a. Therefore, an accept signal 48a assumes a logic 1 at the time slot "1", which causes the controller 10 to apply the timing signal to the bank #0 over the line 10c (FIG. 1). Further, the accept signal 48a assuming a logic 1, causes the controller 10 to apply one of the control signals 10h and 10i depending on the read/write command 10b. The address signal 12b, which is applied to the controller 10 from the address decoder 12, has not been shown as previously mentioned.

At the following three time slots "2", "3" and "4", the shift registers 36a, 38a and 40a apply a logic 0 to the AND gate 46a, and hence the output of the AND gate 46a (the busy signal) assumes a logic 0 which indicates that the bank #0 is now busy or unavailable. Thus, the accept signal 48a assumes a logic 0. In other words, the controller 10 does not accept another bank #0 access request (if any) while of the busy signal from the AND gate 46a assumes a logic 0.

At the time slot "1", the AND gate 44a receives, at the first input thereof, a logic 1 from the input terminal 32a. However, the AND gate 44a receives, at the second input thereof, a logic 0 from the non-inverted output terminal of the shift register 34c. Consequently, the AND gate 44a outputs a logic 0 which indicates that the controller 10 has not rejected the bank #0 access request in question.

Let it be assumed that the bank #2 access request is applied to the terminal 32c at the time slot "2". If this happens, an AND gate 44c receives logic 1s at both the first and the second inputs thereof at the time slot "2". This is because (a) the shift register 34a outputs at the non-inverted output thereof, a logic 1 which represents a logic 1 of the bank #0 access request which been delayed by one time slot and (b) the bank #2 access request is directly applied to the first input of the AND gate 44c. The output of the AND gate 44c (logic 1) is applied to the OR gate 28. Therefore, the OR gate 28 outputs the request rejected signal which assumes a logic 1 at the time slot "2" as shown in FIG. 3. In response to this request rejected signal, the CPU 8 again applies the bank #2 access request to the memory main controller 10. In more specific terms, after the issuance of the request rejected signal 10j from the OR gate 28, if one time slot is required when the controller 10 accepts the reissued bank #2 access request signal from the CPU 8, the controller 10 is ready to accept the bank #2 access request at the "4". However, the request is applied to the controller 10 at a time slot "5" in this particular embodiment.

Figure 3:
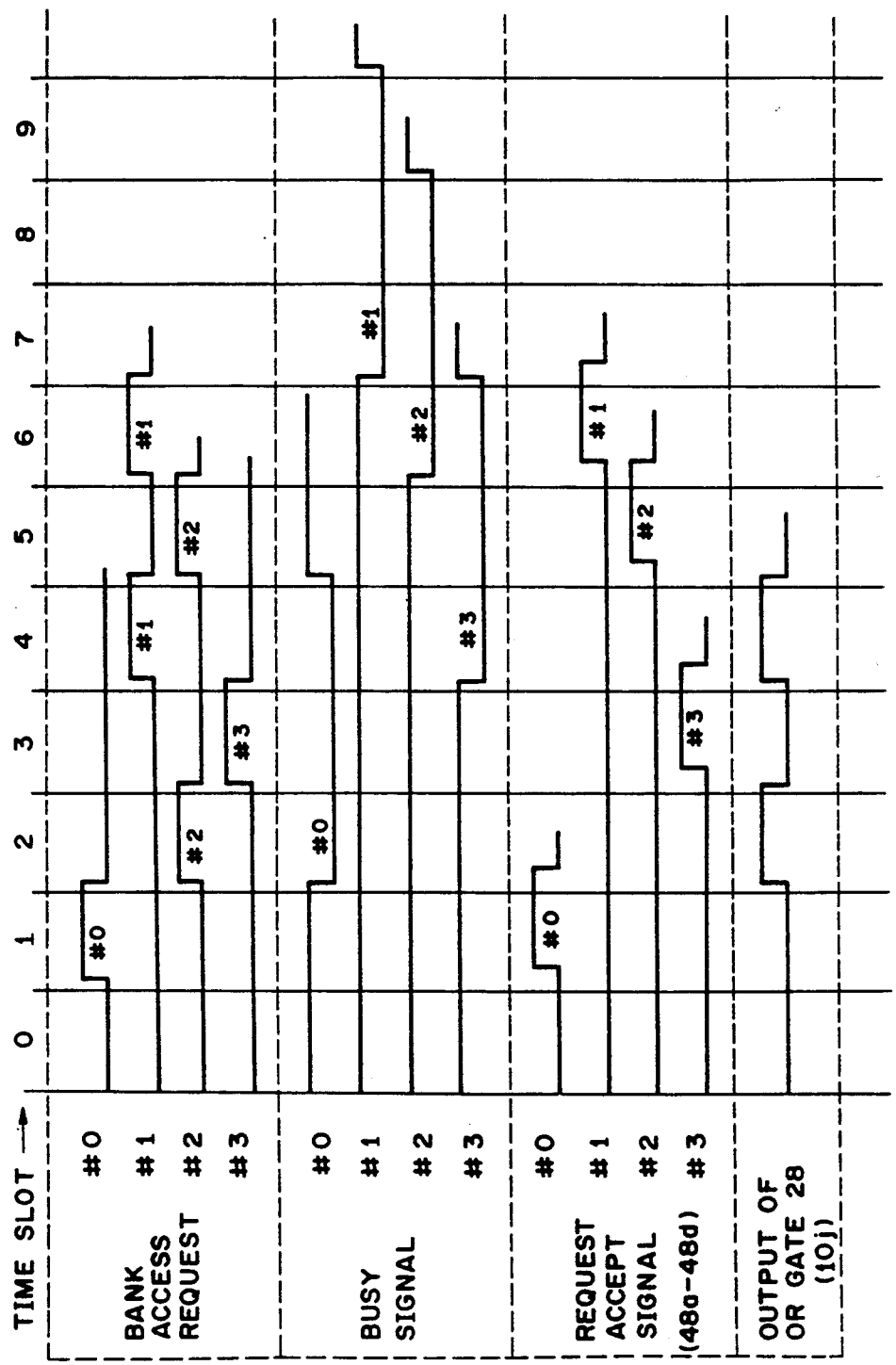
FIG. 3 is a time chart which illustrates the operation of the arrangements shown in FIGS. 1 and 2.

As seen from FIG. 3, the AND gate 46b outputs a busy signal which assumes a logic 0 during three consecutive time slots "6"–"8". The generation of the busy signal has been described in the above.

It is understood from the forgoing that the memory main controller 10 receives bank access requests from the system controller 8 and generates a request rejected signal 10j in the event that a bank access request consecutively occurs in connection with one bank group. Thus, application of two successive data to each of the read and write data control registers with the same bank group is prohibited, and erroneous data storage in the above-mentioned data control registers is prevented.

Returning to FIG. 3, the operations in connection with the access requests to the banks #3 and #1 will be described in a simplified manner.

A bank #3 access request is applied to an input terminal 32d (FIG. 2) at the time slot "3" and is accepted by the controller 10 at the same time slot. Consequently, a busy signal (the output of an AND gate 46c) assumes a logic 0 during the three time slots "4", "5" and "6" as shown in FIG. 3. At the next time slot "4", a bank #1 access request occurs and is applied to an input terminal 32b. In this case, the output of the OR gate 28 (the request rejected signal) assumes a logic 1 at the time slot "4" in the same manner as in the above-mentioned bank #2 access request. Thereafter, the CPU 8 reissues, at the time slot "5", the bank #1 access request which is accepted by the controller 10. Thus, a busy signal outputted from a AND gate 46b assumes a logic 0 during consecutive three time slots "7", "8" and "9".

The present invention has been described in connection with two bank groups each of which consists of two banks. However, it is within the scope of this invention to modify the aforesaid embodiment to include more than two bank groups and to include more than two banks within each group.

What is claimed is:

1. An apparatus for controlling access requests to memory banks in a digital data processing system, comprising;
   a system controller;
   a plurality of memory banks which are divided into a plurality of bank groups;
   first means operatively coupled between said system controller and said plurality of memory banks and controlling read and write operations thereof, said first means receiving a plurality of bank access requests, said first means issuing a first control signal indicating that a bank access request has not been accepted when two or more bank access requests consecutively request access to one bank group, said first control signal being applied to said system controller; and
   a plurality of pairs of read and write data control registers, each of the pairs of read and write data control registers being operatively coupled to a different bank group and being controlled by said first means.

2. An apparatus as claimed in claim 1, wherein said first means comprises;
   a plurality of second means, each of which is operatively coupled to a different memory bank and receives a bank access request from said system controller, each of said plurality of second means generating said first control signal when one of said plurality of second means belonging to a given bank group receives a bank access request which immediately follows a bank access request applied to another one of said plurality of second means belonging to said given bank group.

3. An apparatus as claimed in claim 2, wherein each of said plurality of second means issues a busy signal indicating if a bank access request applied thereto is acceptable, said busy signal assuming a predetermined logic level during predetermined time slots and causing each of said second means to reject acceptance of a bank access request directed thereto during said predetermined time slots.

4. An apparatus as claimed in claim 3, wherein each of said plurality of second means comprises;
   a first shift register which is supplied with a bank access request, said first shift register outputting inverted and non-inverted logic levels of said bank access request applied thereto, at a time slot which follows a time slot during which said bank access request is applied to said first shift register;
   a first AND gate which includes first, second and third input terminals, said first input terminal receiving said bank access request applied to said first shift register, said second input terminal being coupled to receive a logic level which is a one time-slot delayed inverted logic level of a bank access request applied to another second means, said first AND gate issuing a signal indicating whether or not said bank access request applied to said first shift register is accepted, said first AND gate generating an output;
   a plurality of second shift registers, arranged in series, for receiving the output of said first AND gate, each of said second shift registers outputting inverted and non-inverted logic levels;
   a second AND gate being provided with a plurality of input terminals coupled to receive the inverted logic levels generated from said second shift registers, said second AND gate applying the output thereof to said third input terminal of said first AND gate; and
   a third AND gate including first and second input terminals, said first input terminal of said third AND gate receiving said bank access request applied to said first shift register, and said second input terminal of said third AND gate being coupled to receive the output of said second AND gate.

* * * * *

UNITED STATES PATENT AND TRADEMARK OFFICE
CERTIFICATE OF CORRECTION

PATENT NO. : 5,313,603

DATED : May 17, 1994

INVENTOR(S) : Tohru Takishima

It is certified that error appears in the above-identified patent and that said Letters Patent is hereby corrected as shown below:

On the Title Page, item [73]:

Assignee: delete "Nec", insert --NEC--.

Col. 4, line 50, after "which", insert --has--.

Signed and Sealed this

Twenty-third Day of August, 1994

Attest:

BRUCE LEHMAN

Attesting Officer

Commissioner of Patents and Trademarks